(Model.)

7 Sheets—Sheet 1.

J. P. HALLENBECK.
BUTTON HOLE ATTACHMENT FOR SEWING MACHINES.

No. 273,727.

Patented Mar. 13, 1883.

WITNESSES:
Francis A. Sims
Thomas S. Breslin

INVENTOR:
Joseph P. Hallenbeck
by Austin F. Park
attorney.

N. PETERS, Photo-Lithographer, Washington, D. C.

(Model.) 7 Sheets—Sheet 2.
J. P. HALLENBECK.
BUTTON HOLE ATTACHMENT FOR SEWING MACHINES.
No. 273,727. Patented Mar. 13, 1883.

WITNESSES:
Francis A. Sims
Thomas S. Breslin

INVENTOR:
Joseph P. Hallenbeck
by Austin F. Park
attorney.

(Model.)

7 Sheets—Sheet 5.

J. P. HALLENBECK.
BUTTON HOLE ATTACHMENT FOR SEWING MACHINES.

No. 273,727. Patented Mar. 13, 1883.

WITNESSES:
Francis A. Sims
Thomas S. Breslin

INVENTOR:
Joseph P. Hallenbeck
by Austin F. Park
attorney.

(Model.)

J. P. HALLENBECK.

BUTTON HOLE ATTACHMENT FOR SEWING MACHINES.

No. 273,727.  Patented Mar. 13, 1883.

7 Sheets—Sheet 6.

WITNESSES:
Francis A. Sims
Thomas L. Breslin

INVENTOR:
Joseph P. Hallenbeck
by Austin F. Park
attorney.

(Model.) 7 Sheets—Sheet 7.
J. P. HALLENBECK.
BUTTON HOLE ATTACHMENT FOR SEWING MACHINES.
No. 273,727. Patented Mar. 13, 1883.
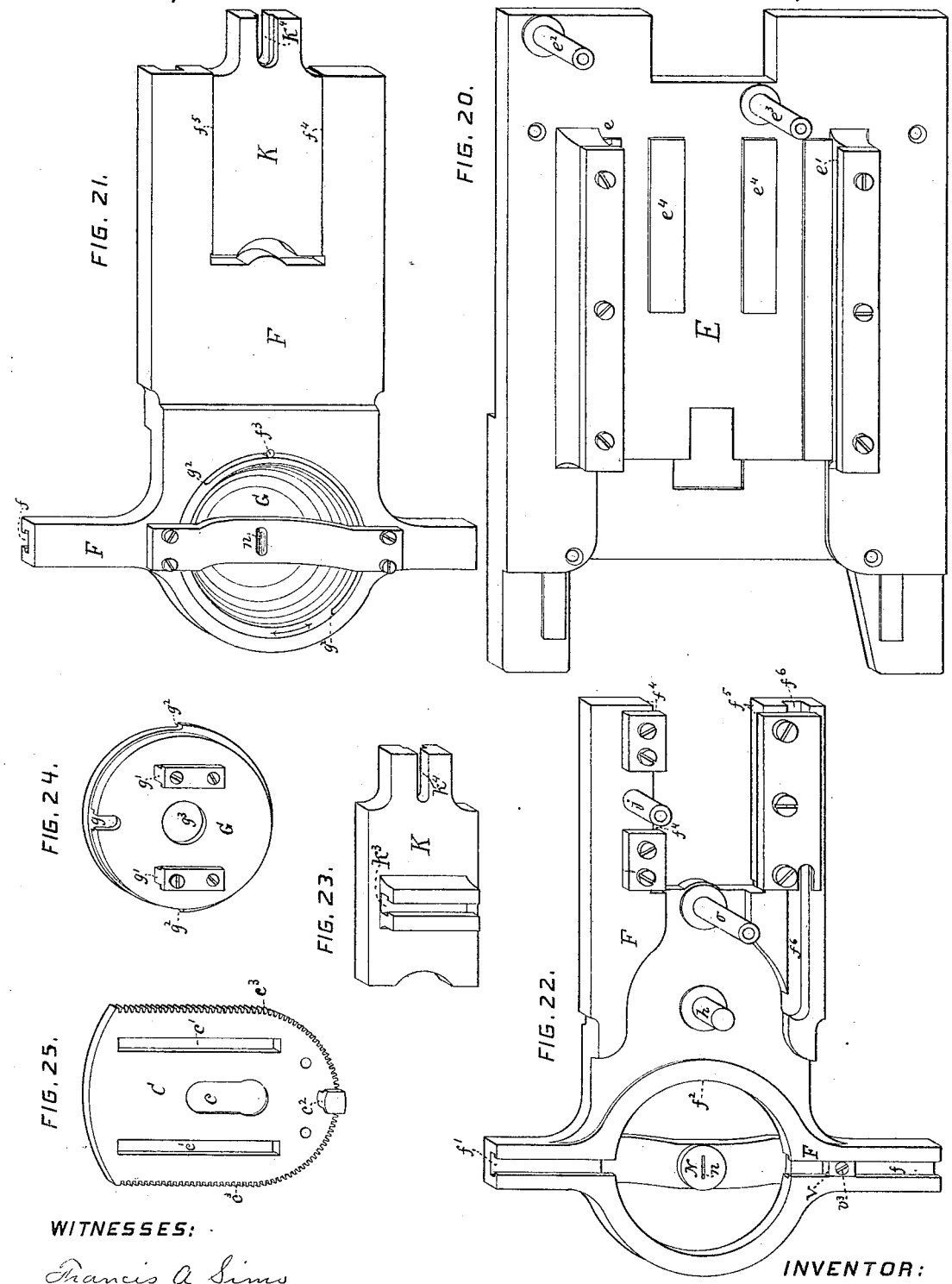
WITNESSES:
Francis A. Sims
Thomas S. Breslin
INVENTOR:
Joseph P. Hallenbeck
by Austin F. Park
attorney

UNITED STATES PATENT OFFICE.

JOSEPH P. HALLENBECK, OF NEW YORK, ASSIGNOR TO THE NATIONAL MACHINE COMPANY, OF TROY, N. Y.

BUTTON-HOLE ATTACHMENT FOR SEWING-MACHINES.

SPECIFICATION forming part of Letters Patent No. 273,727, dated March 13, 1883.

Application filed August 30, 1882. (Model.)

*To all whom it may concern:*

Be it known that I, JOSEPH P. HALLENBECK, a citizen of the United States, residing in the city of New York, in the State of New York, have invented certain new and useful Improvements in Button-Hole-Feeding Mechanisms for Sewing-Machines, of which the following is a specification, reference being had to the accompanying drawings.

My invention relates principally to improvements in mechanisms for feeding to sewing-machines button-holes having one end rounded or eyelet-shaped.

The general object of my improvements is to provide a very effective, durable, and easily-adjustable mechanism, which, when properly combined with a sewing-machine adapted to make the common lock-stitch, chain-stitch, or other suitable stitch from a continuous thread or continuous threads, shall be capable of holding and automatically feeding to the stitch-forming devices of the sewing-machine fabrics having button-holes of various sizes with one end rounded or eyelet-shaped, so as to thereby cause the rapid and thorough binding of the edges of such button-holes all around by a series of overedge-stitches, which radiate along the semicircular end and are substantially parallel along the sides of each button-hole, and which, by adjustments in said mechanism, can be made of different uniform lengths and at various uniform distances apart, and to firmly bar the narrow end of the button-hole.

Figure 1:
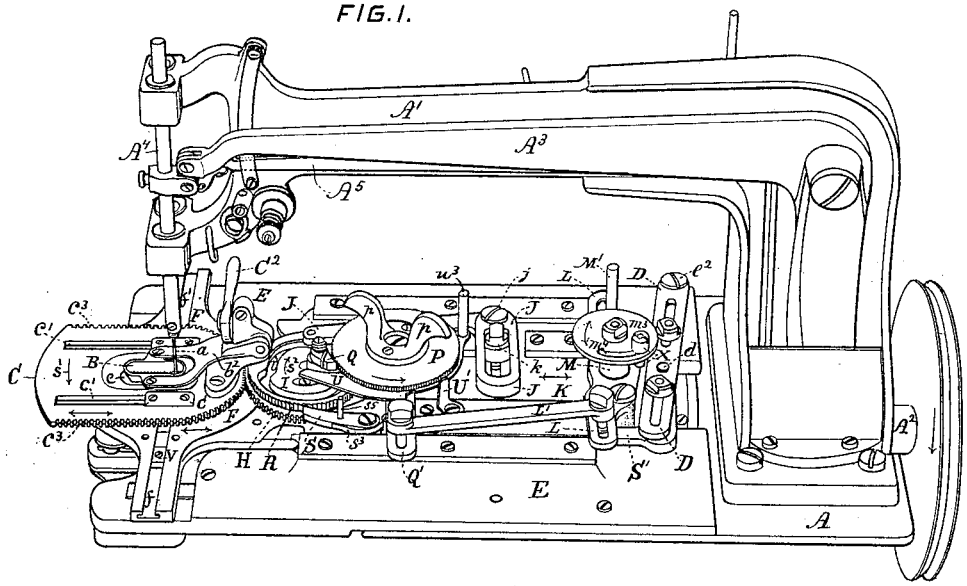
Figure 2:
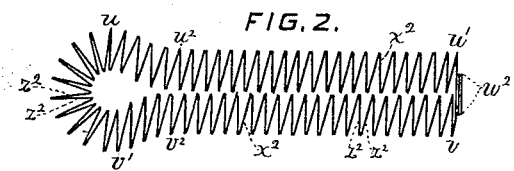
Figure 3:
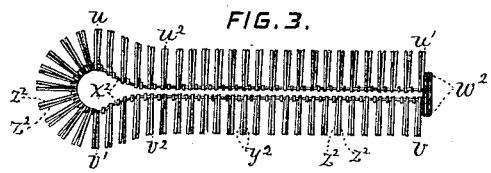
Figure 4:
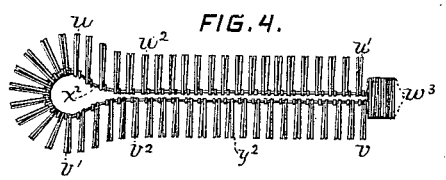
Figure 12:
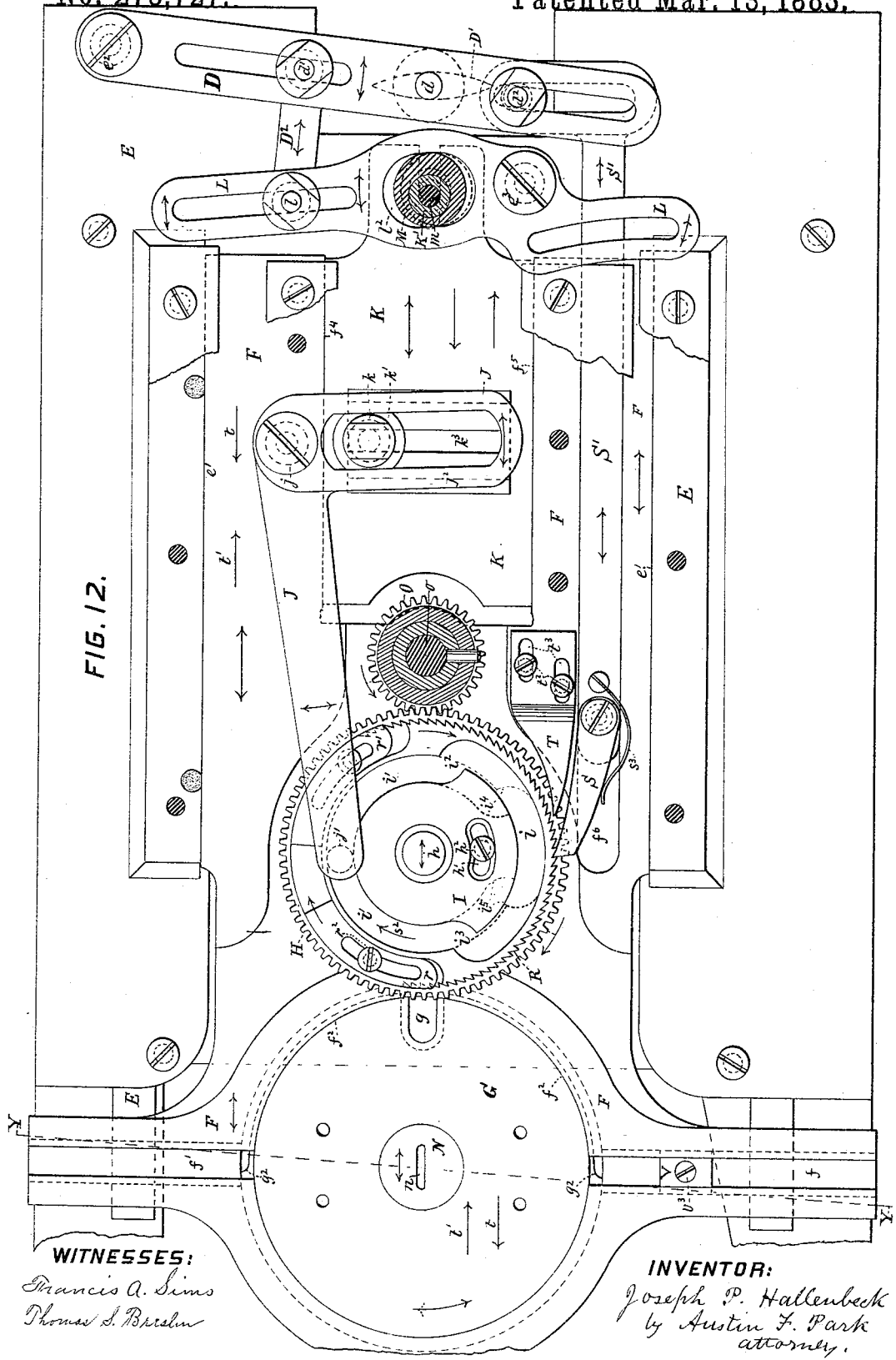
Figure 13:
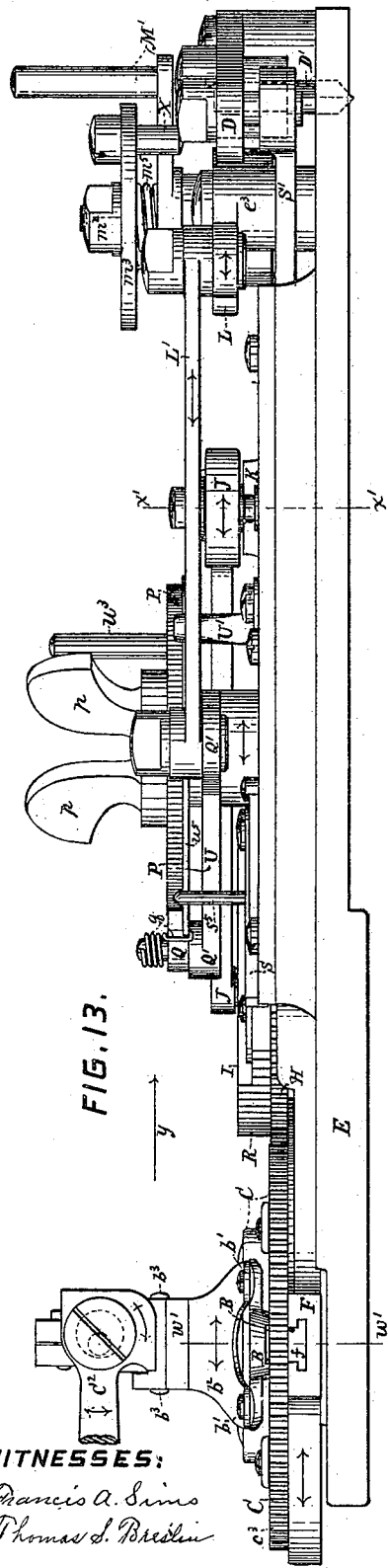
Figure 14:
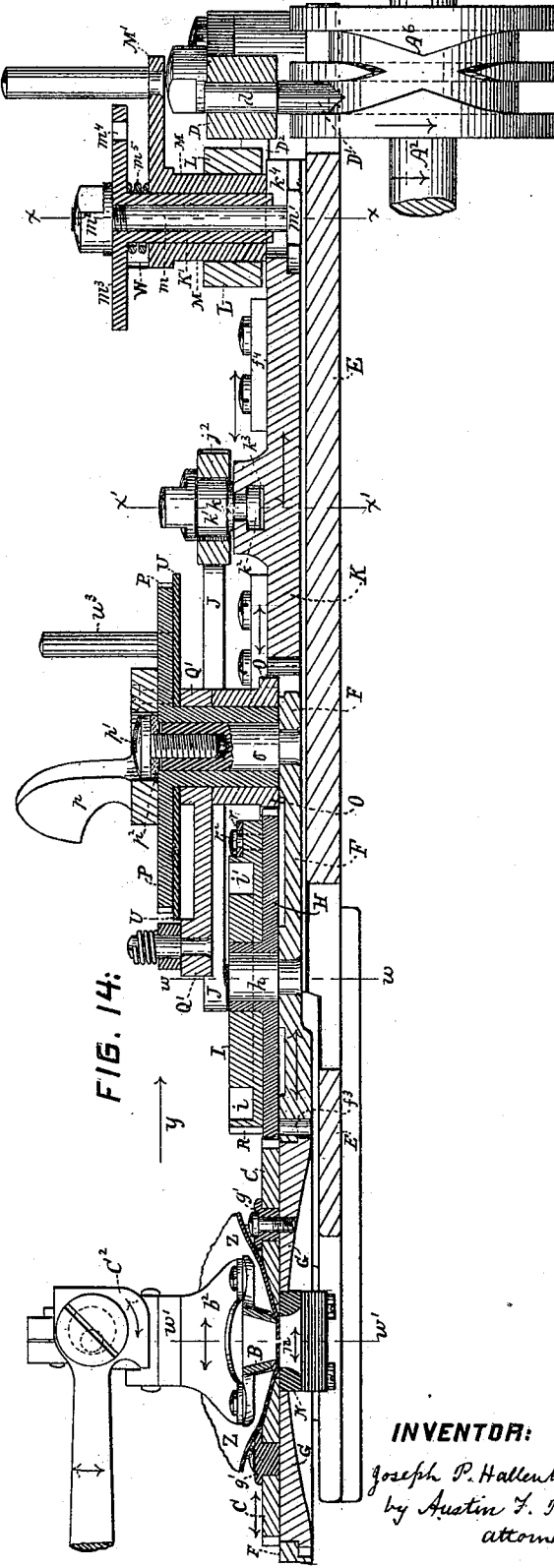

In the accompanying drawings, Figure 1 is perspective view of one of my improved button-hole-feeding mechanisms combined with a sewing-machine adapted to produce the well-known lock-stitch, the work-holder being represented in position to present the middle part of the rounded end of a button-hole to the stitch-making devices. Figs. 2, 3, 4, 5, 6, 7, 8, 9, 9$^a$, 9$^b$ indicate some of the various arrangements of stitches that can be made along the sides and around and across the ends of button-holes by means of the mechanism shown in Fig. 1 and modifications thereof hereinafter described. Fig. 10 is a plan of the same button-hole-feeding mechanism represented in Fig. 1, but detached from the sewing-machine, and showing the work-holder in one of its positions at or near the beginning of the feeding and stitching of a button-hole along one side. Fig. 11 is a plan of the same feeding mechanism with the work-holder in one of the positions it occupies after the completion of the stitching of the edges of the button-hole and while the narrow end of the button-hole is being barred, as indicated in Figs. 2, 3, or 4. Fig. 12 is a plan of a portion of the same feeding mechanism, some of the parts being removed, some others represented in section, and those shown being in the same positions as in Fig. 1. Fig. 13 is a side elevation of the same feeding mechanism, and Fig. 14 is a vertical longitudinal section thereof at about the line $z\ z$ in Fig. 11, and elevation of some parts viewed in the direction pointed by the arrow $z'$ in the latter figure. Figs. 15, 16, 17, 18, and 19 are partial transverse sections and elevations of the same mechanism, all viewed in the direction indicated by the arrow $y$ in Figs. 10, 13, and 14, in which the places of the sections are indicated by broken lines, to wit: for Fig. 15 by the line $y'\ y'$, for Fig. 16 by line $x\ x$, for Fig. 17 by line $x'\ x'$, for Fig. 18 by line $w\ w$, and for Fig. 19 by line $w'\ w'$. Figs. 20, 21, 22, 23, 24, and 25 are isometrical views, showing some parts of the same mechanism on a smaller scale.

Similar parts are marked by like letters in the different figures, and the directions in which some of the parts move or are movable in use are indicated by adjacent arrows.

One special object of this invention is to provide efficient means by which a sewing-machine having an eye-pointed needle constantly supported and actuated by one end part and moving to and fro endwise in one line only, with coacting devices for making common lock-stitches, chain-stitches, or other suitable stitches from a continuous thread or continuous threads can automatically bind the edges of an eyelet-end button-hole by a series of overedge-stitches that radiate along the semicircular outer edge of the eyelet end, and are essentially parallel along the other edges of the button-hole, substantially as indicated in Figs. 2, 3, 4, 6, or 8. For this purpose I combine with such a sewing-machine a button-hole work-holder of suitable oblong form and construction, and mechanism capable of imparting from the sewing-machine to the work holder momentary intermittent to-and-fro movements to form the overedge-stitches, and, also, first a progressive lengthwise movement, with a gradual transverse movement in the last part of said lengthwise movement, to place the overedge-stitches substantially parallel to each other along one side of the button-hole, as from $v$ to $v'$; next a progressive semicircular movement to place the overedge stitches radially along the rounded end of the button-hole, as from $v'$ to $u$, and next a progressive lengthwise movement, with a gradual transverse movement in the first part of said latter lengthwise movement, to place the overedge-stitches essentially parallel to each other along the other side of the button-hole, as from $u$ to $u'$. By this combination of the button-hole work-holder and feeding mechanism with a sewing-machine which makes common lock-stitches or other suitable stitches from a continuous thread or continuous threads, eyelet-end button-holes are bound all around by a series of overedge-stitches in which two stretches of binding-thread extend on each side of the fabric from the edge of the button-hole to each perforation made in the fabric by the needle. The aforesaid combination which produces this result is substantially different from and far superior in utility to the combination of a button-hole work-holder and feeding mechanism with a sewing-machine, using only a short thread and a needle which is wholly passed through the fabric at each perforation, as in hand-sewing, whereby an eyelet-end button-hole can be bound by a series of overedge-stitches in which only one stretch of binding-thread extends on each side of the fabric from each perforation to the edge of the button-hole.

In carrying out my aforesaid combination the Howe, Singer, Wheeler & Wilson, Willcox & Gibbs, or other suitable sewing-machine which produces the lock-stitch, chain-stitch, or other suitable stitch from a continuous thread or continuous threads can be employed, and various combinations of mechanical devices can be used for imparting the several aforesaid movements to the button-hole work-holder from the needle bar or lever, or from a rotary cam or shaft, or from other suitable part of whatever sewing-machine shall be used. The sewing-machine and construction of feeding mechanism which I commonly prefer are represented in part in Fig. 1, wherein A is the stationary bed, A' the bracket-arm, $A^2$ the driving-shaft, $A^3$ the needle-operating lever, $A^4$ the needle-bar, and $A^5$ the take-up lever, of a No. 7 Wheeler & Wilson sewing-machine, the usual presser bar and foot and feeding device being removed, and the parts that coact with the needle $a$ in making lock-stitches being covered by my work supporting and feeding mechanism.

The work-holder in my improved mechanism may be like some clamping devices or feed-feet that are used in button-hole-sewing mechanisms, and can have any suitable construction that will secure the proper accurate holding of the button-hole fabric for the action of the stitching devices. In the mechanism shown in the drawings the work-holder consists of an oblong feed-foot, B, Figs. 10, 11, 13, 14, 19, conformed to an eyelet-end button-hole, and having teeth $b$ along its lower edge, and jointed at $b'$ $b'$ to a spring-arm, $b^2$, that is hinged at $b^3$ to a carrier, C, which has a spring, C', for elevating the arm $b^2$, and is furnished with a cam-lever, $C^2$, by which the feed-foot can be depressed into an opening, $c$, in said carrier, and there held with a spring-pressure on the button-hole work, Z, Fig. 14, which is supported by a smooth surface on which the carrier moves, so that the button-hole work will be securely held and moved upon said smooth surface by the feed-foot.

Figure 15:
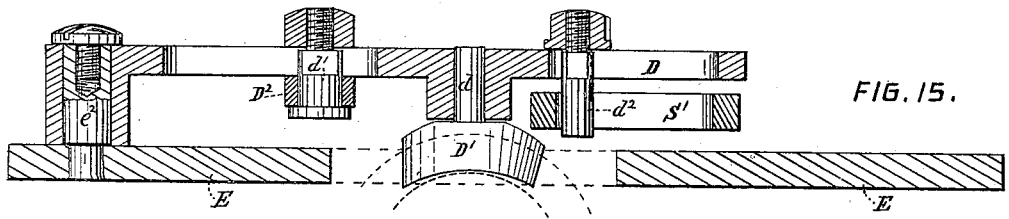

As a preferred means for imparting from a sewing-machine to the button-hole work-holder the several movements required to make the mechanism automatically bind an eyelet-end button-hole by a series of overedge-stitches that radiate along the semicular end edge and are essentially parallel along the other edges of the button-hole, I combine with the work-holder a bar or lever that is adapted to be moved to and fro by the sewing-machine, and devices for imparting from the bar or lever to the work-holder a step-by-step lengthwise movement, next a step-by-step semicircular movement, and next a step-by-step lengthwise movement, a gradual transverse movement in one direction in the last part of said first lengthwise movement, a gradual reverse transverse movement in the first part of said latter lengthwise movement, and momentary to-and-fro movements transverse to the direction of said lengthwise movements and throughout said lengthwise and semicircular movements. All those movements are imparted to the work-holder B in the mechanism represented by the drawings, by suitable devices, from a bar or lever, D, that can be connected with a sewing-machine, so as to be thereby moved to and fro in harmony with the movements of the sewing-machine needle. For this purpose a switch-cam, $A^6$, Fig. 14, is fast on the rotary shaft $A^2$ of the sewing-machine shown in Fig. 1; and D', Figs. 14 and 15, is a follower, pivoted at $d$ to the bar or lever D and engaging with the cam, the whole being so combined that just after one withdrawal of the sewing-machine needle from the work in the work-holder the lever or bar D will be moved in one direction, and will be moved in the opposite direction just after the next withdrawal of the needle, and so on repeatedly.

As a greatly preferred method of imparting to the work-holder the aforesaid lengthwise and semicircular movements and gradual transverse movements in reverse directions just before and after said semicircular movement, I mount the work-holder on a suitable movable support and combine with the workholder and its said support mechanism for imparting to the work-holder, upon and separately from said support, the said lengthwise and semicircular movements, and for imparting to said support, and thereby to the workholder, the gradual transverse movements in reverse directions just before and after the semicircular movement. I also greatly prefer to combine with the work-holder and its said support means for automatically imparting to said support, and thereby to the work-holder, intermittent momentary to-and-fro movements transverse to said lengthwise movements of the work-holder and during its said lengthwise and semicircular movements.

E, Figs. 1, 10, 20, is a bed-plate which is to be firmly secured to or may constitute the base of the sewing-machine.

F, Figs. 1, 10, 12, 22, is a plate which supports the work-holder and its immediate carrier, and is movable to and fro in or on ways or guides $e\ e'$, Fig. 20, on the base E; but the part F can be made movable to and fro about a pivot in an extension of the line $w'\ w'$, Fig. 10, in carrying out the primary parts of this invention.

Figure 19:
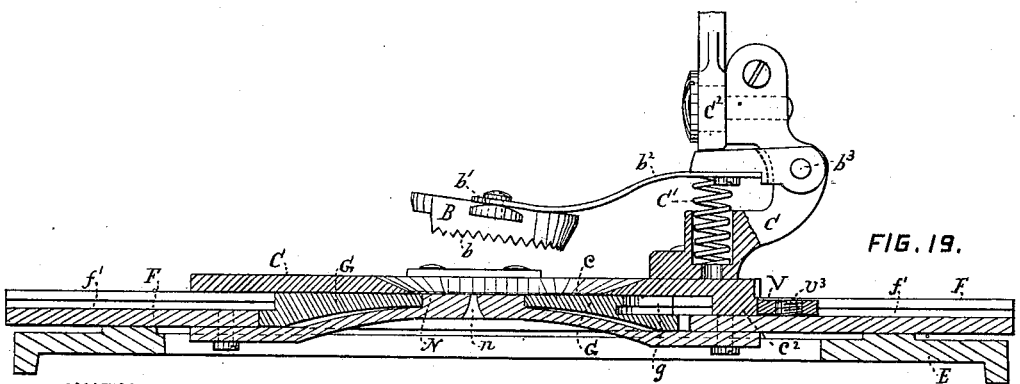

The work-holder B and its carrier C partake of all the movements of the support F, and are also movable to and fro lengthwise and in a semicircle upon and separately from that support. For accurately directing and imparting the aforesaid lengthwise and semicircular movements to the work-holder upon and separately from the support F, the following construction is commonly preferred, to wit: The part F is formed with two straight opposite guides, $f f'$, Figs. 12 and 22, and with a semicircular guide, $f^2$, Fig. 12, extending between the guides $f f'$. A disk, G, Figs. 12, 19, 24, is mounted on or in the part F, so that the disk can be turned to and fro in a semicircle along the guide $f^2$, and the disk has a short guide, $g$, which is like either of the guides $f f'$ in cross-section, and is directly opposite to and forms a continuation of either the guide $f$ or the guide $f'$, when the disk is at one or the other end of its semicircular movement, as in Figs. 10, 11, or 19. The disk G and the work-holder carrier C are respectively formed or furnished with straight guides $g'$ and $c'$, Figs. 24 and 25, which fit together and are parallel to the lengthwise direction of the work-holder, and also parallel to the guides $f f'$, when the disk G is at either end of its semicircular movement. The carrier C is also formed or furnished with a guide, $c^2$, Fig. 25, which fits and is movable along each of the guides $f, f'$, $f^2$, and $g$, and the part C has a feed-gear, $c^3$, with a semicircular portion between two parallel straight parts and engaging with a driving gear-wheel, H, that is carried by the part F, and is mounted to rotate thereon about a stud, $h$. Those parts are so arranged that when the work-holder carrier C is in the position represented in Figs. 10 and 19, with the guide $c^2$ engaged with the guide $f$, by then turning the gear-wheel H in the direction pointed by the arrow $s^2$ the carrier C will be first moved in a straight course in the lengthwise direction of the workholder, as pointed by the arrow $s$ in Fig. 10, until the part $c^2$ engages with the guide $g$ of disk G and leaves the guide $f$. The gear H will then engage with the semicircular part of the feed-gear $c^3$, and will turn the carrier C, with the disk G, through a semicircle, while the part $c^2$ remains engaged with the guide $g$ and passes along the guide $f^2$ and until it is opposite to the guide $f'$. Then the gear-wheel H will engage with the other straight part of the gear $c^3$, and the part $c^2$ will engage with and move along the guide $f'$, while the carrier C is being again moved in a straight course in the lengthwise direction of the work-holder, as indicated by the arrow $s$ in Fig. 11. By turning the gear-wheel H in the reverse direction the carrier C will be moved backward from its place in Fig. 11 to its position in Figs. 10 and 19. For limiting the turning movement of the disk G on the part F, these parts are formed or furnished with stops $g^2\ g^2$ and $f^3$, Fig. 21.

For imparting to the slide F, and thereby to the work-holder mounted thereon, the aforesaid gradual movements transverse to and during the lengthwise movements of the workholder, and in reverse directions just before and after its aforesaid semicircular movement, to cause the proper placing of the overedge-stitches along the inner parts of the eyelet end of a button-hole, as from $v^2$ to $v'$ and from $u$ to $u^2$, Figs. 2, 3, or 4, I combine with the slide F and the gear-wheel H, from which the lengthwise and semicircular movements are imparted to the work-holder, means whereby said gradual movements in reverse directions shall be imparted to the slide F from said gear-wheel. This object can be accomplished by various devices; but I commonly prefer for that purpose to have the gear-wheel H furnished with a cam, I, Figs. 12 and 18, having the two concentric connected parts $i\ i'$ of different radii, and an elbow-lever, J, pivoted at $j$ to the slide F, and having on one arm a follower, $j'$, engaging with the cam I, and the other arm, $j^2$, engaging with a stop or abutment, $k$, on a part, K, which is stationary in respect to said gradual movements to be imparted to the slide F, and thereby to the work-holder. These parts are so combined that when, by the turning of the gear-wheel H, the work-holder carrier C approaches the end of its first straight movement in the direction indicated by the arrow $s$ in Fig. 10, the follower $j'$ on the lever J will gradually pass at $i^2$ from the cam-arc $i$ to the cam-arc $i'$, and will thereby cause the lever J, with the stop $k$ as a fulcrum, to give to the slide F, and thereby to the carrier C and work-holder, a short gradual movement in the direction pointed by the arrow $t$ in Fig. 10; also, when by the turning of the gear H the work-holder carrier C has finished its semicircular movement and is in the first part of its second lengthwise movement, the follower $j'$ will then gradually pass at $i^3$ from the cam-arc $i'$ to the cam-arc $i$, and will thus cause the lever J to move the slide F, with the carrier C and work-holder, a short distance in the reverse direction. (Indicated by the arrow $t'$, Fig. 11.)

Figure 17:
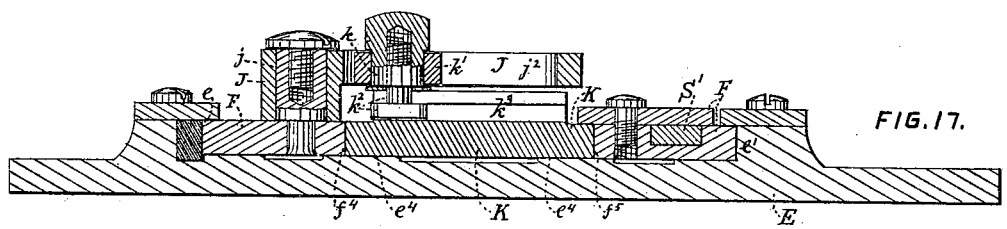

To adapt the mechanism for feeding button-holes having eyelet-shaped ends of different sizes, I provide means for conveniently altering the lengths of the aforesaid gradual movements imparted to the slide F and work-holder carrier just before and after the semicircular movement of the latter, and preferably by making the abutment-stud $k$ for the lever J adjustable along its arm $j^2$ to different distances from its pivot $j$. For that purpose the stud $k$, Fig. 17, is closely surrounded by a collar, $k'$, fitting in the slotted arm $j^2$, and has an internal screw-thread engaging with a clamp-screw, $k^2$, having a head fitting in and adjustable along a recessed groove, $k^3$, Fig. 23, in the part K.

Figure 18:
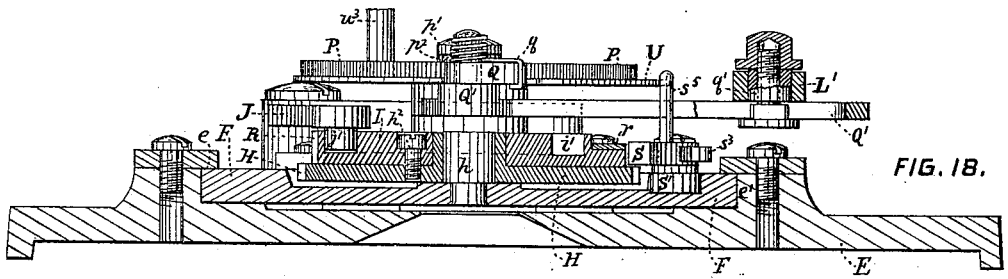

The wheel H and cam I may be in one piece; but for convenience in construction and to provide for adjusting the cam on the wheel and into proper relation to the follower $j'$ and the semicircular and straight parts of the feed-gear $c^3$ on the work-holder carrier, the cam I, Figs. 12, 14, 18, is preferably made in a separate piece from the wheel H and mounted concentrically thereon, and formed with a curved slot, $h'$, and furnished with a headed screw, $h^2$, Fig. 18, extending through said slot and adapted to clamp the cam to the gear-wheel in somewhat different positions.

Various devices can be used for imparting to the slide F and the work-holder thereon momentary to-and-fro movements transverse to the direction of the aforesaid lengthwise movements and during said lengthwise, semicircular, and gradual transverse movements of the work-holder. For that purpose the driving-lever D is pivoted at $e^2$ to the base E, and is connected by a link, $D^2$, to a lever, L, which is pivoted at $e^3$ to the base E, and embraces a part, M, on the part K, which in this case is fitted to slide between guides $f^4$ $f^5$, Figs. 17, 21, 22, on slide F, and against the base E at $e^4$, so that to-and-fro movements shall be imparted to the slide K by the to-and-fro movements of the lever D or L, and the to-and-fro movements of the slide K are imparted to the slide F through the lever J and cam I, which connect the two slides, as above specified.

To adapt the mechanism to produce over-edge-stitches of different lengths or of different depths from the edge of the button-hole, I provide means for altering the lengths of the momentary to-and-fro movements imparted to the work-holder with and by the slide F, carrying the work-holder. For this purpose the rod or link $D^2$ is connected to the levers D and L by pivots $d'$ and $l$, Figs. 15 and 16, which are adjustable along those levers to different distances from their fulcrums by clamping devices indicated in the drawings, so that while the to-and-fro movements of the lever D remain the same, different lengths of to-and-fro movements can be imparted therefrom to the slide F and the work-holder by the adjustable link $D^2$, lever L, part M, slide K, and the aforesaid parts by which the slides K and F are connected together.

Figure 16:
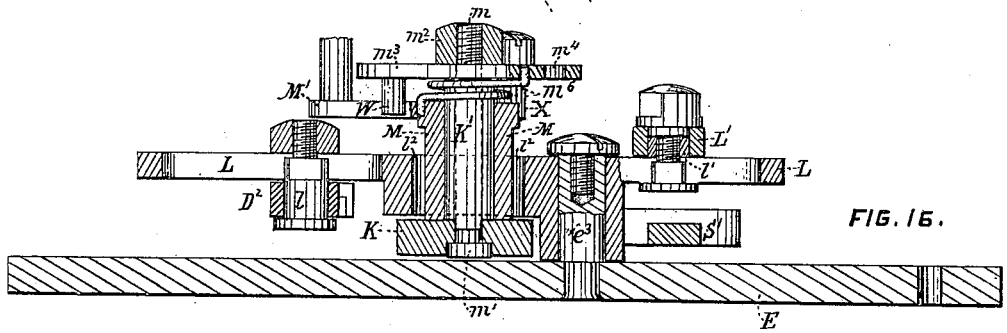

Figs. 14 and 16 show means for so adjusting the part K, and consequently the slide F, carrier C, and work-holder B, in respect to the driving-lever L that when the mechanism is combined with a sewing-machine the work-holder shall be in proper position in respect to the working point of the sewing-machine needle to insure the placing of the overedge-stitches in the right positions in relation to the edge of whatever eyelet-end button-hole shall be properly held by the work-holder. For this purpose the part M, which connects the slide K with lever L, is made adjustable along that slide by a stud, K', which supports the part M, and fits by a tongue on its lower end into a slot, $k^4$, Fig. 23, in the part K, and can be fastened at different points along that slot by a screw-bolt, $m$, extending through the part K' and slot $k^4$, and having a head, $m'$, at the bottom and a clamping-nut, $m^2$, at the top.

To avoid having an open space between the throat-plate through which the needle works and the plate which surrounds the throat-plate, and to avoid the sliding of the button-hole work upon said plates in its to-and-fro movements by and with the work-holder in directions transverse to the length of the slit in the button-hole and to the lengthwise movements of the work-holder, and thus avoid the consequent liability of displacing the button-hole in the work-holder by such transverse movements, I make the throat-piece N, Figs. 12, 14, 19, 21, 22, with an oblong needle-hole, $n$, and cause it to partake of all the movements of the work-holder in directions transverse to its lengthwise movements by securing said throat-piece to the slide F, on which the work-holder is mounted, and I have the throat-piece N of circular form and fit it in a circular perforation, $g^3$, Fig. 24, in the disk G, carried by said slide.

To provide excellent means for imparting to the work-holder carrier C a faster movement while turning in a semicircle than while moving in straight courses; to properly space the overedge-stitches along the rounded end and sides of the button-hole, I combine with the work-holder carrier C and its driving-gear H a pinion, O, Figs. 10, 11, 12, 14, means for imparting directly to said pinion, and thereby to the gear H, a slow step-by-step rotary movement, and means for imparting directly to the gear H independently of the pinion O faster step-by-step rotary motion only while the gear H engages with the semicircular part of the gear $c^3$ of the work-holder carrier. For imparting said slow motion to the pinion O and faster movement to the gear-wheel H, various well-known pawl-and-ratchet or friction devices can be used. For thus turning the pinion O on a stud, $o$, on the part F, a fine-toothed ratchet-wheel, P, of much greater diameter than the pinion O, is firmly secured to the latter, and is furnished with a driving-pawl, Q, having an engaging-spring, $q$, or with two or more such pawls adapted to alternately engage with the teeth of the ratchet-wheel.

For imparting the occasional faster movement to the gear-wheel H, the latter has fast thereon a coarse-toothed ratchet, R, Figs. 10, 11, 12, furnished with a driving-pawl, S, having an engaging-spring, $s^3$, and so arranged that the pawl S shall engage with and actuate the ratchet only while the gear H engages with the semicircular part of the feed-gear $c^3$.

For imparting the proper to-and-fro movements to the driving-pawls S and Q from the driving-lever D various devices can be used; but for these purposes I commonly prefer to have the driving-pawl S pivoted on and carried by a bar, S', Fig. 12, which is fitted to slide in a guideway, $f^6$, Fig. 22, in the part F, and has a joint-connection with the lever D, and to have the pawl Q mounted on and carried by one arm of an elbow-lever, Q', which is pivoted concentrically with the ratchet-wheel P, and has its other arm connected by a rod, L', to the lever L, which is linked by the rod $D^2$ to said driving-lever.

To render the mechanism capable of placing the overedge-stitches at different uniform distances apart along the side edges of the button-hole, I provide means for conveniently altering the length of the steps imparted to the work-holder in its lengthwise movements. For that purpose the rod L' is connected to the levers L and Q' by pivots $l'$ and $q'$, Figs. 16 and 18, that are adjustable along those levers, substantially as shown in the drawings.

To adapt the mechanism for placing the overedge-stitches at various uniform distances apart along the semicircular end of the button-hole, I provide means for altering the lengths of the steps imparted from the lever D to the work-holder in its semicircular movement. For that purpose the sliding bar S', which carries the pawl S, is connected to the lever D by a stud, $d^2$, Fig. 15, that is adjustable along that lever by devices substantially as shown in the drawings.

To cause the proper engagement of the driving-pawl S with the teeth of the ratchet R, whatever shall be the length of the to-and-fro movements imparted to that pawl by the slide S', a guide-shield, T, Fig. 12, is adjustably secured to the part F by headed screws $t^2$, reaching through slots $t^3$ in the shield, so that the shield T can be set to keep the pawl S out of the ratchet-teeth while the pawl is retracted, as in Fig. 10, and to guide the pawl so that it shall at each forward movement properly engage with the right number of ratchet-teeth, whatever shall be the adjustments of the other parts of the mechanism.

The ratchet R may be in one piece with either the wheel H or cam I, or separate from and secured to the wheel or the cam.

To make the pawl S begin and end its action on the ratchet R at the right points to properly turn the wheel H in relation to the beginning and ending of its engagement with the semicircular part of the feed-gear $c^3$ of the work-holder carrier, two shields, $r\ r'$, Figs. 10, 11, 12, 14, are adjustably secured to the stock of the ratchet R by screws $r^2$, whereby said shields can be adjusted along the ratchet, so as to cause the pawl S to commence and end its action on the ratchet at various different points, as may be required by other adjustments of the mechanism.

To provide means whereby the work-holder carrier can be easily moved forward by hand in its straight and semicircular courses, and also backward when the pawls Q and S are thrown out of their positions for engaging with the ratchets P and R, the ratchet-wheel P or the pinion O is furnished with a hand-piece, $p$, Figs. 1, 10, and 14. For conveniently throwing the pawls Q and S out of and into their positions for engaging with the ratchets P and R, a pawl-shifter, U, Figs. 10, 11, 14, is mounted so that it can be easily turned to and fro by its handle $u^3$ about the axis or hub of the ratchet-wheel P, and has projections $u^4\ u^5$, so shaped and arranged in respect to the pawl Q and a pin, $s^5$, on pawl S that when the part U is turned into its position in Fig. 10 the pawls will be in place to engage with the ratchets, as shown in that figure, and that by turning the shifter U from its place in Fig. 10 to its position in Fig. 11 the pawls will be moved and held away from the ratchets, as represented in Fig. 11, so that a person can then, by the hand-piece $p$, easily rotate the pinion O backward, and thereby cause the backward movement of the work-holder carrier C from its place in Fig 11 to its position in Fig. 10.

U', Figs. 10, 11, 13, is a spring-dog, which is secured to the part F, and bears against the pawl-shifter U, and will engage with either of the notches $o'\ o^2$ in the shifter, and thereby insure the holding of the shifter in either of its positions shown in Figs. 10 and 11, but so that the shifter can be easily turned by hand from either one of those positions to the other.

In Fig. 14, $p'$ is a headed screw tightly engaging with a screw-thread in the journal-stud $o$ of the pinion O and wheel P, and $p^2$ is a somewhat elastic washer or packing pressed by and between the head of the screw and the wheel, so as to produce friction against the latter, and thereby prevent that wheel from being turned by the backward movement of the pawl Q and its carrying-lever Q', or by the to-and-fro turning of the pawl-shifter U, or by the momentum of the parts.

To limit the backward movement of the work-holder carrier C to the proper place for beginning the stitching of the button-hole, I secure to the part F a stop-piece, V, Figs. 11, 12, 19, 22, which can be fastened by a screw, $v^3$, Fig. 19, at different distances from the needle-hole $n$ in the throat-piece N to suit the various lengths of button-holes to be worked.

To make the mechanism capable of properly feeding an eyelet-end button-hole to bar its narrow end, I provide means by which the part F, and thereby the work-holder carrier C, can be moved to and fro in a direction transverse to the lengthwise movements of the work-holder carrier, and in addition to its aforesaid other movements. For this purpose the part M, Figs. 1, 12, 14, 16, fits in an elongated opening, $l^2$, Fig. 12, through the part or lever L, and is in the form of an eccentric or cam, as shown in section in Fig. 12, and has a lateral arm, M', and is mounted so that it can be turned by hand by said arm to and fro on the stud K', Figs. 12 and 13, a distance limited by stops W and X, Figs. 10, 11, 13, and 16, on a cap, $m^3$, on said stud, which is firmly secured to the part K. These parts are so arranged that by turning the cam M by its arm M' from its place against the stop W shown by Figs. 1, 10, 12, and 16 to its position against the stop X shown by Figs. 11, 13, and 14 the part K, and consequently the slide F and work-holder carrier C, will be moved in the direction pointed by the arrow $t'$ a proper distance to change the placing of the overedge-stitches from one side edge of a button-hole to across its slit, as at $w^2$ in Figs. 2 or 3, and so that by turning the cam M by its arm M' from its position against the stop X to its place against the stop W the part K, and consequently the parts F and C, will be moved a like distance in the reverse direction pointed by the arrow $t$ to change the placing of the overedge-stitches from across the slit of the button-hole to one side edge thereof.

The stop X is provided with a screw and nut, by which the stop can be adjusted along a curved slot, $m^4$, Fig. 10, in the cap $m^3$ to different distances from the stop W, as required when different lengths of overedge and barring stitches are made.

To retain the cam M in whatever position it shall be placed by turning its arm M', a compressed friction-producing spring, $m^5$, Figs. 13 and 14, is interposed between the part M and cap $m^3$; or to return the arm M' to and keep it against the stop W whenever the arm shall be released after being turned to or toward the stop X, a retracting-spring, $m^6$, Fig. 16, may have one end secured to the part M and the other end to the cap $m^3$.

To cause overedge lock-stitches around a button-hole to appear on the upper surface of the fabric, substantially as indicated in Fig. 2, the tension on the lower thread in the sewing-machine is made so great in respect to the tension of the needle-thread that only those parts of the overedge-stitches that consist of the needle-thread $x^2$ are left exposed on the upper surface of the fabric. To cause the overedge lock-stitches around the button-hole to have the appearance indicated in Fig. 3, 4, 5, 6, 7, 8, or 9 on the upper surface of the fabric, the tension of the needle-thread is made so great in respect to the tension of the under thread in the sewing-machine that the needle-thread draws loops of the under thread, $y^2$, up through and over the fabric to the inner edge of the button-hole, along which edge the needle-thread $x^2$ is left extending in a line through the loops of the under thread.

In using the above-described feeding mechanism in combination with a sewing-machine to stitch eyelet-end button-holes, the work-holder carrier C is first moved by the hand-piece $p$ into the position shown in Figs. 10 and 19, with the guide $c^2$ against the stop V, and the button-hole work Z, Fig. 14, is placed under and pressed and held by the feed-foot B upon the smooth upper surface of the plates G N where exposed through the opening $c$ in the carrier of the work-holding foot. Then, if the narrow end of the button-hole is to be left unbarred or barred by a bunch of stitches, as indicated in Figs. 2 or 3, the arm M' of cam M is placed and left against the stop W and the pawl-shifter U is set, as in Fig. 10, so that the pawls Q and S will be in place to operate the ratchets P and R, respectively. Then the sewing-machine is put in operation, and imparts intermittent momentary to-and-fro movements of uniform length to the lever D, from which lever, by devices above described, a continuous series of uniform intermittent momentary to-and-fro movements are imparted to the slide K, and thence to the slide F, and thereby to the carrier C and work-holder B, to form overedge or to-and-fro stitches. While these intermittent momentary to-and-fro movements are being thus communicated to the work-holder further movements are imparted thereto from the lever D by the above-described connecting devices, to wit: First, a step-by-step straight lengthwise movement is given to the carrier C and work-holder B separately from the slide F and in the direction pointed by the arrow $s$ in Fig. 10, to place the overedge-stitches along one straight edge of the button-hole from $v$ to $v^2$, Figs. 2 or 3, and while this straight movement of the carrier C is being somewhat continued across the slide F a step-by-step movement is imparted to slide F, and thereby to the carrier C separately from the slide K, and in the direction pointed by the arrow $t$, Fig. 10, to place the overedge-stitches along one side edge of the eyelet-end part of the button-hole from $v^2$ to $v'$. Next a step-by-step semicircular movement in the direction pointed by the arrow $s'$, Fig. 1, is given to the carrier C and holder B separately from the slide F, to place the overedge-stitches, radially along the semicircular end of the button-hole from $v'$ to $u$. Next a straight lengthwise step-by-step movement is imparted to the carrier C and work-holder B in the direction pointed by the arrow $s$ in Fig. 11 and separately from the slide F, and at the same time a short step-by-step movement is given to the slide F, and thereby to the carrier C and holder B, in the direction pointed by the arrow $t'$, to place the overedge-stitches along the other side edge of the eyelet end of the button-hole from $u$ to $u^2$, and then the latter straight lengthwise movement of the carrier C and work-holder is continued to place the stitches along the other straight side edge of the button-hole from $u^2$ to $u'$. Then, to bar the narrow end of the button-hole, as indicated at $w^2$ in Figs. 2 or 3, the pawl-shifter U is turned by hand from its position in Fig. 10 to its place in Fig. 11, to stop the lengthwise movement of the work-holder, and at the same instant the arm M' of the cam M is turned by hand from against the stop W, as in Fig. 10, to against the stop X, as in Fig. 11, to change the placing of the overedge-stitches from the side to across the narrow end of the button-hole, as at $w^2$, and then, by a few of the stitches there placed together, the end of the button-hole is barred, whereupon the sewing-machine is stopped, the stitching and barring of the button-hole being completed.

Figure 5:
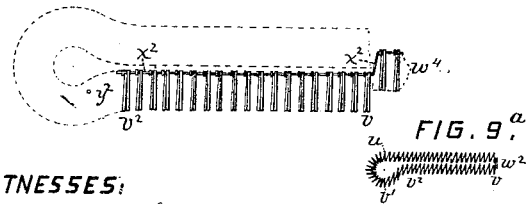

To bar the end of the button-hole in the manner indicated at $w^3$ in Fig. 4, the pawl-shifter U is to be kept in the position shown in Fig. 10, and the arm M' of the cam is placed against the stop X at the starting of the sewing-machine, and is there held until a first straight row of a few progressive barring-stitches is made, as at $w^4$ in Fig. 5. Then the arm M' is instantly turned to against the stop W, and is left in that position while the overedge-stitching progresses along the button-hole from $v$ to $u'$, and when the latter point is reached the arm M' is instantly turned to against the stop X and there retained until the barring is completed by a second short row of progressive to-and-fro stitches placed over the first row, whereupon the action of the sewing-machine and feeding mechanism is stopped.

Figure 6:
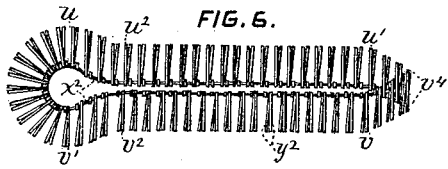
Figure 7:
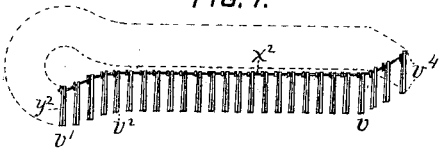

To bar the narrow end of a button-hole, as indicated in Fig. 6, the pawls Q and S are to be kept in position to turn the ratchets P and R, and the arm M' of cam M is first held against the stop X, and then, as each to-and-fro stitch is produced, the arm M' is turned a step toward the stop W, so that when the arm reaches the latter stop a few progressive barring-stitches have been made in an inclined course, as from $v^4$ to $v$ in Figs. 7 or 6. Then the arm M' is left against the stop W until the edges of the button-hole are stitched from $v$ to $u'$, and then the arm M' is turned a step toward the stop X as each to-and-fro stitch is made until the arm reaches the latter stop, and a row of barring-stitches extends in an inclined course from $u'$ to $v^4$, as in Fig. 6.

Figure 8:
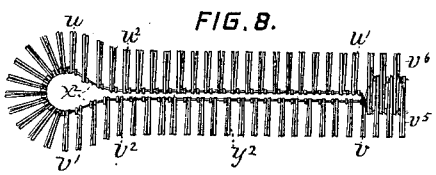
Figure 9:
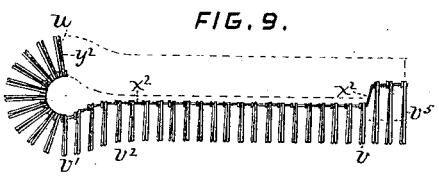
Figure 10:
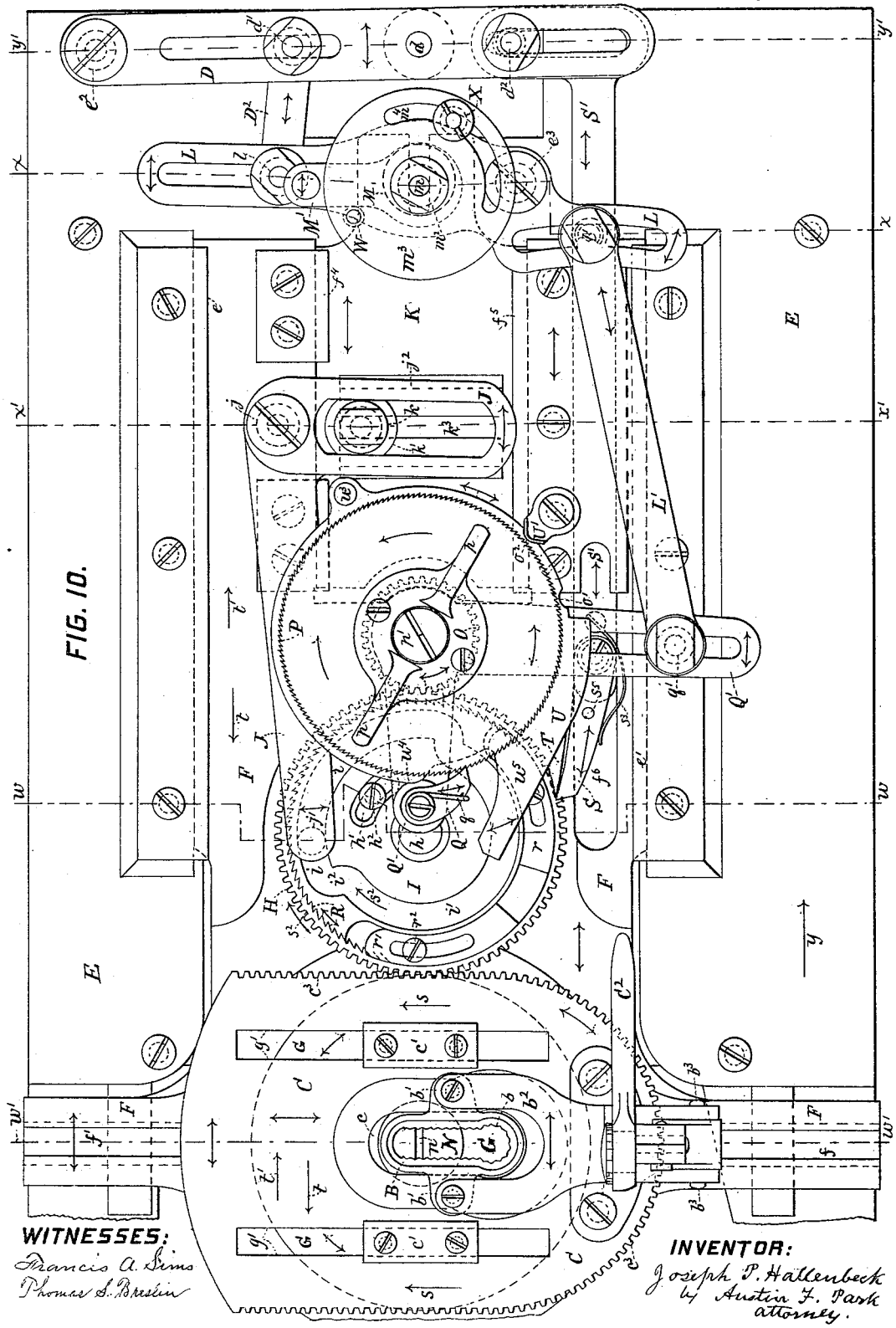
Figure 11:
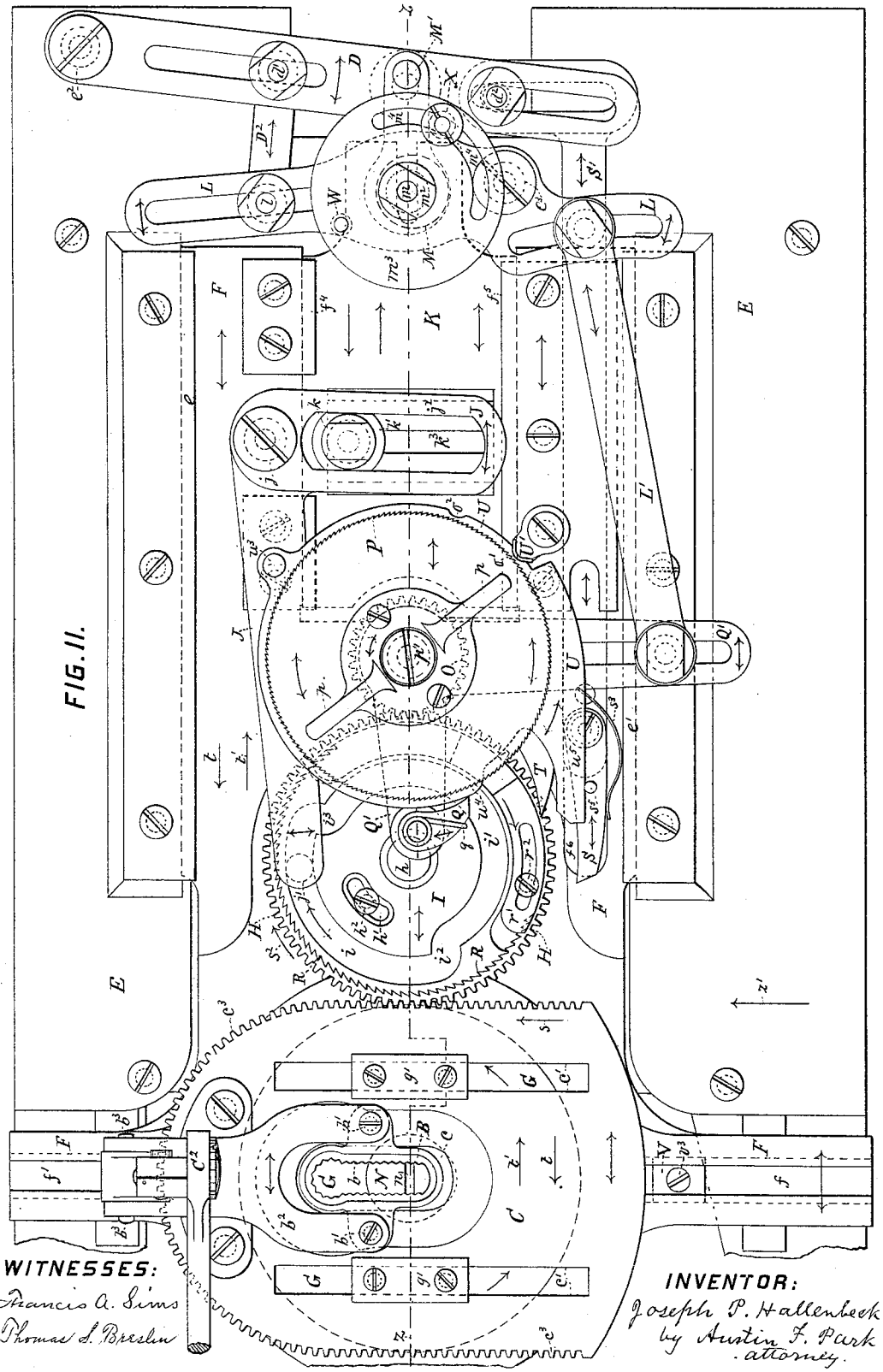

To bar a button-hole, as shown in Fig. 8, the pawls Q and S are kept in place to turn the ratchets P and R, and the arm M' of the stitch-shifting cam M is placed first against the stop X as the lever D is moved into its position in Fig. 10, and next against the stop W as the lever D reaches its place in Fig. 11, and so on repeatedly until a few long barring-stitches are made in a straight row, as from $v^5$ to $v$ in Figs. 9 or 8. Then the arm M' is left against the stop W, as in Fig. 10, until the edges of the button-hole are stitched from $v$ to $u'$, and then the arm M' is turned first against the stop X as the lever D is moved into its position in Fig. 10, and is next moved to against the stop W as the lever D is moved into its position in Fig. 11, and so on repeatedly until a second straight row of a few long barring-stitches is made to overlap the first row, as from $u'$ to $v^6$ in Fig. 8.

In case the mechanism is to be used to feed to a sewing-machine a button-hole having one open rounded end and one side edge continued in a straight line to the semicircular end of the button-hole, substantially as indicated in Figs. $9^a$ or $9^b$, the above-specified short step-by-step transverse movement of the work-holder in one direction by and with its carrier C and the slide F just before or after the semicircular movement of the work-holder is to be omitted by shortening the cam-arc $i$ and lengthening the cam-arc $i'$ of the cam 1 at one or the other end, as indicated by dotted lines at $i^4$ or $i^5$ in Fig. 12. By having the arc $i'$ of the cam I extended at both ends, as indicated by the dotted lines at $i^4$ and $i^5$ in Fig. 12, the mechanism can be used to feed to a sewing-machine a button-hole having both side edges continued in straight line to a semicircle at one end.

In the drawings, the ways $f f'$ for the work-holder carrier C are shown perpendicular to the direction of movement of the slide F, but can be somewhat inclined thereto, as indicated by the line Y Y in Fig. 12, and the other parts conformed to such variation, if desired, to make the overedge-stitches appear more nearly perpendicular to the edges of the button-hole. For a similar purpose, instead of imparting a step movement to the gear H at each movement of the lever D in one direction only, or at each second ascent of the needle of the sewing-machine, as above set forth, a step movement can be imparted to the gear H from the lever D or from the sewing-machine by well-known pawl-and-ratchet feeding devices at each movement of the lever D in either direction, or at every ascent of the sewing-machine needle.

When the mechanism is being used the parts which do not hold the button-hole fabric and are not moved directly by hand are generally covered by a casing or casings. (Not shown in the drawings, but shaped and arranged to prevent contact of the fabric with the gearing and other driving parts of the mechanism.)

That portion of the mechanism which serves to impart to the work-holder by its carrier C, first a progressive straight lengthwise movement with a gradual transverse movement in one direction in the latter part of said lengthwise movement, next a progressive semicircular movement, and next a progressive straight lengthwise movement with a gradual reverse transverse movement in the first part of said latter lengthwise movement, is not limited in its use to its combination with devices for imparting to the work-holder by its carrier C intermittent momentary to-and-fro movements transverse to the direction of said lengthwise movement and throughout its said lengthwise and semicircular movements, but can be successfully used to impart the same lengthwise, semicircular, and reverse transverse movements to the button-hole work-holder in combination with a sewing-machine in which to-and-fro or overedge stitches are produced by reason of the lateral to-and-fro movements of the needle or by other well-known devices. Thus the mechanism shown in the drawings is adapted to feed fabrics having eyelet-end button-holes to a suitable sewing-machine which makes to-and-fro or overedge-stitches by leaving out the devices for imparting from the lever D intermittent momentary to-and-fro movements to the part K, as by disconnecting the part K from the lever L and fastening the part K to the stationary part E, or by disconnecting the part L from the levers D and Q', suitably connecting the lever Q' to the lever D independently of the part L, and making the part L stationary on the base E.

I believe that in some button-hole-stitching mechanisms devised before my present invention a button-hole work-holder, in the operation of stitching an eyelet-end button-hole, has received from automatic means, first a step-by-step lengthwise movement and a short lateral movement in one direction in the last part of said lengthwise movement, next a step-by-step semicircular movement, and next a step-by-step lengthwise movement and a short reverse lateral movement in the first part of said latter lengthwise movement, and sometimes intermittent momentary to-and-fro movements transverse to said lengthwise movements and throughout said lengthwise and semicircular movements, an example being described in United States Patent No. 50,989. In that example, however, a short thread is used and the needle is passed entirely through the fabric, as in hand-sewing, and the work-holder receives a momentary transverse movement in one direction at each ascent of the needle and a momentary transverse movement in the opposite direction at each descent of the needle, to form overedge-stitches in which only one overedge thread or stitch extends on each side of the fabric from each perforation made by the needle.

Prior to this invention eyelet-end button-holes had been bound by a series of overedge-stitches by means of automatic mechanism consisting of a sewing-machine having an eye-pointed needle moving to and fro laterally, as well as endwise, to form overedge-stitches, in combination with a button-hole work-holder and mechanism for imparting to the work-holder, first a progressive lengthwise movement with a short gradual lateral movement in the last part of said lengthwise movement, next a semicircular movement, and next a progressive lengthwise movement with a short gradual reverse lateral movement in the first part of said last lengthwise movement. Such prior mechanisms required as a necessary element a sewing-machine having an eye-pointed needle moving to and fro laterally. Consequently in such prior mechanisms it is impossible to use any of the vast numbers of common lock-stitch and chain-stitch sewing-machines that are in use throughout the country and do not have the needle move to and fro laterally. By my invention I avoid all necessity for having the needle of the sewing-machine move to and fro laterally in mechanisms for binding eyelet-end button-holes by a series of overedge lock-stitches or chain-stitches, and accomplish the very important object of furnishing simple and effective means whereby the common lock-stitch and chain-stitch sewing-machines that do not have the needle move to and fro laterally can be used in binding eyelet-end button-holes. That object I attain by providing for or combining with such a sewing-machine a suitable button-hole work-holder and mechanism for imparting to the work-holder a progressive lengthwise movement, next a progressive semicircular movement, next a progressive lengthwise movement, short gradual lateral movements in one direction in the last part of said first lengthwise movement and in the opposite direction in the first part of said last lengthwise movement, and also momentary to-and-fro movements transverse to the direction of said lengthwise movements and throughout said lengthwise and semicircular movements.

A button-hole-feeding mechanism composed of a suitable work-holder, a lever or bar adapted to be moved to and fro by a sewing-machine, and mechanism for imparting the aforesaid progressive lengthwise, semicircular, short lateral, and momentary to-and-fro transverse movements to the work-holder, all from said bar or lever only, is believed to be new, and is of very great practical importance, because it can be very easily and cheaply combined for use with any suitable common lock-stitch or chain-stitch sewing-machine by placing and securing such feeding mechanism in fit relation to the sewing-machine and properly connecting any suitable moving part of the latter with said bar or lever only of the feeding mechanism.

What I claim as my invention is—

1. The combination, with a sewing-machine having an eye-pointed needle and means for moving the needle to and fro endwise and for producing therewith stitches from a continuous thread or continuous threads, substantially as specified, of a button-hole work-holder and mechanism for imparting to the work-holder a progressive lengthwise movement, next a progressive semicircular movement, next a progressive lengthwise movement, short gradual lateral movements in one direction during the last part of said first lengthwise movement and in the opposite direction during the first part of said last lengthwise movement, and intermittent momentary to-and-fro movements transverse to said lengthwise movements and throughout said lengthwise and semicircular movements, and in one direction at one ascent of the sewing-machine needle and in the opposite direction at the next ascent thereof, all substantially as described.

2. The combination, with a button-hole work-holder and mechanism for imparting to the work-holder a step-by-step semicircular movement, progressive lengthwise movements prior and subsequent to said semicircular movement, and short gradual transverse movements just before and after said semicircular movement, substantially as set forth, of means for altering the length of said gradual transverse movements of the work-holder, substantially as described.

3. The combination, with a button-hole work-holder and means for imparting to said work-holder a semicircular movement, lengthwise movements prior and subsequent to said semicircular movement, and gradual transverse movements just before and after said semicircular movement, and for altering the length of said gradual transverse movements, substantially as described, of means for imparting to said work-holder intermittent momentary to-and-fro movements transverse to the direction of said lengthwise movements and during said lengthwise, semicircular, and variable transverse movements, substantially as set forth.

4. The combination, with a button-hole work holder and a bar or lever adapted to be moved to and fro by a sewing-machine, of mechanism for imparting from said bar or lever to the work-holder a step-by-step lengthwise movement, next a step-by-step semicircular movement, next a step-by-step lengthwise movement, and momentary to-and-fro movements transverse to the direction of said lengthwise movements and throughout said lengthwise and semicircular movements, substantially as set forth, and means for altering the lengths of said momentary to-and-fro movements of the work-holder, substantially as described.

5. The combination, with a button-hole work-holder and a bar or lever adapted to be moved to and fro by a sewing-machine, of mechanism for imparting from said bar or lever to the work-holder, first a step-by-step lengthwise movement, next a step-by-step semicircular movement, next a step-by-step lengthwise movement, a step-by-step short lateral movement in the last part of said first lengthwise movement, and momentary to-and-fro movements transverse to the direction of said lengthwise movements and throughout said lengthwise, semicircular, and short lateral movements, all substantially as described.

6. The combination, with a button-hole work-holder and a bar or lever adapted to be moved to and fro by a sewing-machine, of means for imparting from said bar or lever to the work-holder, first a step-by-step lengthwise movement, next a step-by-step semicircular movement, next a step-by-step lengthwise movement, a step-by-step short lateral movement in the first part of said last lengthwise movement, and momentary to-and-fro movements transverse to the direction of said lengthwise movements and throughout said lengthwise, semicircular, and short lateral movements of the work-holder, all substantially as described.

7. The combination, with a button-hole work-holder and a bar or lever adapted to be moved to and fro by a sewing-machine, of mechanism for imparting from said bar or lever to the work-holder, first a step-by-step lengthwise movement, next a step-by-step semicircular movement, next a step-by-step lengthwise movement, step-by-step short lateral movements in one direction in the last part of said first lengthwise movement and in the opposite direction in the first part of said last lengthwise movement, and momentary to-and-fro movements transverse to the direction of said lengthwise movements and throughout said lengthwise, semicircular, and short lateral movements, all substantially as set forth.

8. The combination, with a button-hole work-holder and a movable support, F, for the work-holder, of mechanism for imparting to the work-holder upon and separately from its said support, first a progressive lengthwise movement, next a progressive semicircular movement, and next a progressive lengthwise movement, substantially as described, and means for imparting to said support, and thereby to the work-holder, a short gradual movement transverse to and during the latter part of said first lengthwise movement of the work-holder, substantially as set forth.

9. The combination, with a button-hole work-holder and a movable support for the work-holder, of mechanism for imparting to the work-holder upon and separately from its said support, first a lengthwise movement, next a semicircular movement, and next a lengthwise movement, substantially as described, and means for imparting to said support, and thereby to the work-holder, a short gradual movement transverse to and during the first part of said latter lengthwise movement of the work-holder, substantially as set forth.

10. The combination, with a button-hole work-holder and a movable support for the work-holder, of mechanism for imparting to the work-holder upon and separately from its said support a semicircular movement and prior and subsequent lengthwise movements, substantially as set forth, of means for imparting to said support, and thereby to the work-holder, short gradual movements transverse to said lengthwise movements of the work-holder and in opposite directions just before and after its said semicircular movement, substantially as described.

11. The combination, with a button-hole work-holder and a movable support for the work-holder, of mechanism for imparting to the work-holder a semicircular movement and a prior and subsequent lengthwise movement upon and separately from its said support, substantially as set forth, and means for imparting to said support, and thereby to the work-holder, short gradual movements transverse to said lengthwise movements of the workholder and in opposite directions just before and after its said semicircular movement, and momentary to-and-fro movements transverse to said lengthwise movements of the work-holder and during its said lengthwise and semicircular movements, substantially as described.

12. The combination, with a button-hole work-holder, a movable support, F, for the work-holder, and a lever adapted to be moved to and fro, of mechanism for imparting from said lever to the work-holder a step-by-step semicircular movement and prior and subsequent lengthwise movements upon and separately from its said support, and to said support, and thereby to the work-holder, step-by-step movements transverse to said lengthwise movements of the work-holder and in opposite directions just before and after its said semicircular movement, all substantially as described.

13. The combination, with a button-hole work-holder, a movable support for the work-holder, and a lever adapted to be moved to and fro, of mechanism for imparting from said lever to the work-holder a step-by-step semicircular movement and prior and subsequent step-by-step lengthwise movements upon and separately from said support, and to said support, and thereby to the work-holder, momentary to-and-fro movements transverse to said lengthwise movements of the work-holder and throughout its said semicircular and lengthwise movements, all substantially as described.

14. The combination, with a button-hole work-holder, a movable support for the work-holder, and a lever adapted to be moved to and fro, of mechanism for imparting from said lever to the work-holder a semicircular movement and prior and subsequent lengthwise movements upon and separately from said support, and to said support, and thereby to the work-holder, short gradual movements transverse to said lengthwise movements, and just before and after said semicircular movement of the work-holder, and momentary to-and-fro movements transverse to said lengthwise movements and during said semicircular and lengthwise movements, all substantially as described.

15. The combination, with a button-hole work-holder, its support, and means for imparting to the work-holder a step-by-step semicircular movement and prior and subsequent lengthwise movements upon and separately from said support, and for imparting to said support, and thereby to the work-holder, gradual movements transverse to said lengthwise movements, all substantially as described, of means for altering the lengths of the steps of the work-holder in its said semicircular movement, substantially as set forth.

16. The combination, with a button-hole work-holder, its support, and means for imparting to the work-holder a semicircular movement and prior and subsequent step-by-step lengthwise movements on and separately from its said support, and for imparting to said support, and thereby to the work-holder, gradual movements transverse to said lengthwise movements, substantially as set forth, of means for altering the lengths of the steps of the work-holder in its said lengthwise movements, substantially as described.

17. The combination, with a button-hole work-holder, its support, and mechanism for imparting to the work-holder semicircular and lengthwise movements upon and separately from said support, and for imparting to said support, and thereby to the work-holder, gradual movements transverse to said lengthwise movements, and momentary to-and-fro movements transverse to said lengthwise movements and during said semicircular and lengthwise movements of the work-holder, substantially as set forth, of means for altering the lengths of said momentary to-and-fro movements of said support and work-holder, substantially as described.

18. The combination, with a button-hole work-holder and the plate G, of mechanism for automatically imparting a semicircular movement to both the work-holder and said plate together, mechanism for moving the work-holder lengthwise upon and separately from said plate before and after said semicircular movement, and mechanism for imparting to said plate and work-holder together gradual movements transverse to said lengthwise movements of the work-holder and in reverse directions just before and after said semicircular movement, all substantially as described.

19. The combination, with a button-hole work-holder, plate G, and a lever, D, of mechanism for imparting from said lever a semicircular movement to both the work-holder and said plate, a lengthwise movement to the work-holder upon and separately from said plate before and after said semicircular movement, and momentary to-and-fro movements to said plate and work-holder during said semicircular and lengthwise movements, all substantially as described.

20. The combination, with a button-hole work-holder and the plate G, of mechanism for imparting a semicircular movement to said plate and work-holder together, mechanism for moving the work-holder lengthwise upon and separately from said plate before and after said semicircular movement, and mechanism for imparting to both the work-holder and said plate gradual movements transverse to said lengthwise movements just before and after said semicircular movement, and momentary to-and-fro movements throughout said lengthwise, semicircular, and gradual transverse movements, all substantially as described.

21. The combination, with plate F, plate G, carried by plate F, and a button-hole work-holder on plate G, of mechanism for imparting a semicircular movement to the work-holder and plate G together, mechanism for moving the work-holder lengthwise upon and separately from said plates before and after said semicircular movement, and mechanism for imparting to plate F, and thereby to plate G and the work-holder, short gradual movements transverse to said lengthwise movements of the work-holder and in opposite directions just before and after said semicircular movement, all substantially as described.

22. The combination, with plate F, plate G, carried by plate F, a button-hole work-holder on plate G, and a lever adapted to be vibrated, of mechanism for imparting from said lever a semicircular movement to the work-holder and plate G together, lengthwise movements to the work-holder before and after said semicircular movement, and momentary to-and-fro movements to plate F throughout said semicircular and lengthwise movements, all substantially as described.

23. The combination, with plate F, plate G, carried by plate F, and a button-hole work-holder mounted on plate G, of mechanism for imparting a semicircular movement to the work-holder and plate G together, for moving the work-holder lengthwise on plate G before and after said semicircular movement, and for imparting to plate F short gradual movements transverse to said lengthwise movements just before and after said semicircular movement, and momentary to-and-fro movements throughout said semicircular and lengthwise movements, all substantially as described.

24. The combination, with plate F, and the work-holder carrier C, having the U-shaped feed-gear $c^3$, and mounted and movable upon and carried by said plate, of means for imparting to said work-holder carrier straight movements and an intermediate semicircular movement upon plate F, and to the latter short gradual movements transverse to said straight movements of the work-holder carrier, and in opposite directions, before and after the said semicircular movement, all substantially as described.

25. The combination, with plate F, work-holder carrier C, having the feed-gear $c^3$, and mounted and movable upon and carried by said plate, and a lever adapted to be moved to and fro, of means for imparting from said lever to said work-holder carrier straight step-by-step movements and an intermediate semicircular step-by-step movement on said plate, and to the latter momentary to-and-fro movements transverse to the direction of said straight movements and during said straight and semicircular movements, all substantially as described.

26. The combination, with plate F and work-holder-carrier C, having the feed-gear $c^3$, and mounted and movable upon and carried by said plate, of means for automatically imparting to the work-holder carrier straight movements, and an intermediate semicircular movement upon said plate, and to plate F short gradual movements transverse to said straight movements, and in opposite directions, just before and after said semicircular movement, and momentary to-and-fro movements throughout said semicircular and lengthwise movements, all substantially as described.

27. The combination, with a plate, F, adapted to be moved to and fro, of a plate, G, carried by and movable to and fro in a semicircle on plate F, a work-holder carrier, C, having the U-shaped feed-gear $c^3$, and mounted on and movable to and fro in a semicircle with plate G, and adapted to be moved to and fro in a straight course on the latter plate, and a gear-wheel, H, mounted on plate F and engaging with said feed-gear, substantially as described.

28. The combination, with plate F, of plate G, mounted and movable in a semicircle on plate F, work-holder carrier C, having the U-shaped feed-gear $c^3$, and mounted on and movable in a semicircle with plate G, and movable to and fro in a straight course on the latter plate, gear-wheel H, mounted on plate F and engaging with said feed-gear, and means for turning said gear-wheel and imparting to plate F short gradual movements in opposite directions just before and after the engagement of said gear-wheel with the semicircular part of said feed-gear, substantially as described.

29. The combination, with plate F, of plate G, mounted on and movable in a semicircle on plate F, work-holder carrier C, having the U-shaped feed-gear $c^3$, and mounted on and movable in a semicircle with plate G, and adapted to be moved to and fro in a straight course on the latter plate, gear-wheel H, mounted on plate F and engaging with said feed-gear, and means for turning said gear-wheel and simultaneously imparting momentary to-and-fro movements to plate F, substantially as described.

30. The combination, with plate F, of plate G, mounted on and movable in a semicircle on plate F, work-holder carrier C, having the feed-gear $c^3$, and mounted on and movable in a semicircle with plate G, and adapted to be moved to and fro in a straight course on the latter plate, gear-wheel H, mounted on plate F and engaging with said feed-gear, and means for turning said gear-wheel and for imparting to plate F momentary to-and-fro movements and short progressive movements in opposite directions just before and after the engagement of said gear-wheel with the semicircular part of said feed-gear, all substantially as described.

31. The combination, with a button-hole work-holder and a throat-piece, N, having an oblong needle-hole, n, of means for automatically imparting to the work-holder lengthwise and semicircular movements upon said throat-piece, and to said throat-piece and work-holder together progressive movements transverse to the direction of said lengthwise movements and just before and after said semicircular movement, substantially as described.

32. The combination, with a button-hole work-holder and throat-piece, N, having the oblong needle-hole n, of means for automatically imparting to the work-holder lengthwise and semicircular movements upon said throat-piece, and to said throat-piece and work-holder together progressive movements transverse to the direction of said lengthwise movements and before and after said semicircular movement, and momentary to-and-fro movements in the same transverse direction and during said semicircular and lengthwise movements, all as set forth.

33. The combination, with plate F and a circular throat-piece, N, having an oblong needle-hole and fast on said plate, of the plate G, fitting closely around said throat-piece, a button-hole work-holder mounted on plate G, and means for automatically imparting a semicircular movement to plate G and the work-holder together, lengthwise movements to the work-holder upon plate G before and after said semicircular movement, and short progressive movements to plate F in opposite directions just before and after said semicircular movement, all substantially as described.

34. The combination, with plate F and circular throat-piece N, fast on said plate, of the plate G, fitting closely around said throat-piece, a button-hole work-holder mounted on plate G, and means for automatically imparting a semicircular movement to plate G and the work-holder together, lengthwise movements to the work-holder upon plate G before and after said semicircular movement, and momentary to-and-fro movements to plate F throughout said semicircular and lengthwise movements, all substantially as described.

35. The combination, with plate F and the circular throat-piece N, fast on said plate, of the plate G, fitting around said throat-piece, a button-hole work-holder on plate G, and means for automatically imparting a semicircular movement to plate G and the work-holder together, lengthwise movements to the work-holder upon plate G before and after said semicircular movement, and to plate F short progressive movements in opposite directions before and after said semicircular movement, and momentary to and fro movements throughout said semicircular and lengthwise movements, all substantially as described.

36. The combination, with plate F, adapted to be moved to-and-fro, and circular throat-piece N, fast on that plate, and having an oblong needle-hole, $n$, of the plate G, fitting closely around and movable to and fro in a semicircle about said throat-piece, the work-holder carrier C, having the feed-gear $c^3$, and adapted to be moved to and fro in a semicircle with plate G and to and fro in a straight course upon the latter plate, and a driving-gear, H, mounted on plate F and engaging with said feed-gear, substantially as described.

37. The plate F, furnished with the circular throat-piece N, and having the straight guides $ff'$ diametrically opposite to the throat-piece, and formed to fit a guide, $c^2$, on the work-holder carrier C, the curved guide $f^2$, extending between the straight guides and concentric with the throat-piece, and a recess extending between the throat-piece and curved guide, and formed to receive and support the plate G flush with the throat-piece and permit plate G to be turned to and fro in a semicircle concentric with the throat-piece and curved guide, as set forth.

38. The plate G, formed with the circular opening $g^3$ and to fit in a recess in plate F, and to be turned therein to and fro in a semicircle closely around and flush with a circular throat-piece, N, on the latter plate, and having the radial guide $g$, like the guides $ff'$ in cross-section, and the guides $g'g'$ parallel to guide $g$, and formed to fit the guides $c'c'$ of the work-holder carrier C, substantially as shown and described.

39. The work-holder carrier C, furnished with a button-hole work-holder, B, and having the opening $c$, U-shaped feed-gear $c^3$, guides $c'c'$, formed to fit the guides $g'g'$ of plate G, and the guide $c^2$, formed to fit the guide $g$ of plate G and the guides $ff'$ of plate F, substantially as described.

40. The combination, with the plate F, having the straight guides $ff'$, intervening curved guide $f^2$, and circular throat-piece N, of the plate G, having the opening $g^3$ and radial guide $g$, and mounted to be turned to and fro in a semicircle on plate F along and between said throat-piece and curved guide, and the work-holder carrier C, adapted to be moved to and fro in a semicircle with and in a straight course upon plate G, and having the guide $c^2$ formed and arranged to engage with the guides $f$, $g$, and $f'$ in succession, substantially as described.

41. The combination, with plate F, plate G, adapted to be moved to and fro in a semicircle on plate F, and work-holder carrier C, fitted to be moved to and fro in a semicircle with and in a straight course upon plate G, of the stop V, arranged on and adjustably secured to plate F, substantially as described.

42. The combination, with the base-plate E, of the plate F, mounted to slide to and fro along ways or guides on said base-plate, plate G, mounted to move to and fro in a semicircle on plate F, and work-holder carrier C, mounted on plate G and fitted to be moved to and fro in a semicircle with and in a straight course upon the latter plate, substantially as described.

43. The combination, with the plate F, work-holder carrier C, having the U-shaped feed-gear $c^3$, and mounted on said plate and movable thereon in semicircular and straight courses, and the gear-wheel H, mounted on said plate and engaging with said feed-gear, substantially as set forth, of means for imparting from said gear-wheel to plate F short progressive movements in opposite directions before and after the engagement of said gear-wheel with the semicircular part of said feed-gear, substantially as described.

44. The combination, with the plate F, adapted to be moved to and fro, work-holder carrier C, having the feed-gear $c^3$, and mounted on said plate and movable thereon in straight and semicircular courses, and the driving gear-wheel H, mounted on said plate and engaging with said feed-gear, substantially as described, of the cam I on said gear-wheel, separate abutment $k$, and lever J, connecting said cam, plate, and abutment, substantially as set forth.

45. The combination, with the plate F, movable to and fro, work-holder carrier C, having the feed-gear $c^3$, and mounted on said plate and movable thereon in semicircular and straight courses, and the gear-wheel H, mounted on said plate and engaging with said feed-gear, substantially as described, of the cam I on said gear-wheel, separate abutment $k$, lever J, connecting said cam, plate, and abutment, and means for altering the lengths of the movements imparted from said gear-wheel to said plate by said cam, lever, and abutment, substantially as set forth.

46. The combination, with the plate F, movable to and fro, work-holder carrier C, having the feed-gear $c^3$, and mounted on said plate and movable thereon in straight and semicircular courses, and the gear-wheel H, mounted on said plate and engaging with said feed-gear, substantially as described, of the cam I on said gear-wheel, separate abutment $k$, lever J, connecting said cam, plate, and abutment, and means for automatically turning said gear-wheel and for imparting momentary to-and-fro movements to said abutment $k$, substantially as set forth.

47. The combination, with the base-plate E, of the slide K, slide F, connected with and adapted to be moved to and fro by and also separately from slide K by means substantially as described, and the work-holder carrier C, carried by slide F and adapted to be moved thereon to and fro in straight and semicircular courses, as set forth.

48. The combination, with the work-holder carrier C, slide F, carrying the work-holder carrier, and slide K, connected with slide F, substantially as described, of means for automatically imparting straight and semicircular movements to the work-holder carrier on slide F, short progressive to-and-fro movements to slide F separately from slide K, and momentary reciprocating movements to slide K, all substantially as set forth.

49. The combination, with the work-holder carrier C, slide F, carrying the work-holder carrier, and slide K, connected with slide F, substantially as described, of a lever, D, and means for imparting from said lever straight and semicircular movements to the work-holder carrier upon slide F, short progressive to-and-fro movements to slide F separately from slide K, and momentary reciprocating movements to the latter slide, all substantially as set forth.

50. The combination, with the base-plate E, slide F, and work-holder carrier C, having the feed-gear $c^3$, and carried by said slide and movable thereon in straight and semicircular courses, substantially as described, of the gear-wheel H, carried by said slide and engaging with said feed-gear, cam I on said gear-wheel, slide K, lever J, connecting said cam and slides, lever D, and means for imparting from said lever momentary reciprocating movements to slide K and step-by-step rotary motion to said gear-wheel, substantially as set forth.

51. The combination, with the base-plate E, slide F, and work-holder carrier C, having the feed-gear $c^3$, and carried by said slide and movable thereon in straight and semicircular courses, substantially as described, of the gear-wheel H, carried by said slide and engaging with said feed-gear, cam I on said gear-wheel, slide K, lever J, connecting said cam and two slides, lever L, link $D^2$, lever D, and means for imparting step-by-step rotary motion to said gear-wheel from the latter lever, substantially as set forth.

52. The combination, with the work-holder carrier C, having the U-shaped feed-gear $c^3$, and adapted to be moved in straight and semicircular courses, substantially as described, of the gear-wheel H, engaging with said feed-gear, pinion O, engaging with said gear-wheel, and means for imparting slow rotary motion to said pinion and, independently of said pinion, faster rotary motion to said gear-wheel, while the latter engages with the semicircular part only of said feed-gear, substantially as described.

53. The combination, with the work-holder carrier C, having the feed-gear $c^3$, and adapted to be moved in straight and semicircular courses, substantially as described, of the gear-wheel H, having the ratchet R, furnished with pawl S, pinion O, having the ratchet-wheel P, of greater diameter than the pinion, and furnished with pawl Q, and means for operating said pawls, substantially as set forth.

54. The combination, with the work-holder carrier C, having the feed-gear $c^3$, and adapted to be moved in straight and semicircular courses, substantially as described, of the gear-wheel H, furnished with the ratchet R and pawl S, pinion O, furnished with the ratchet-wheel P and pawl Q, lever D, and means for imparting to-and-fro movements to said pawls from said lever, substantially as set forth.

55. The combination, with the work-holder carrier C, having the feed-gear $c^3$, and adapted to be moved in straight and semicircular courses, substantially as described, of the gear-wheel H, pinion O, ratchet-wheel P, pawl Q, pawl-carrying lever Q', driving-lever L, and rod L', connecting said levers, substantially as set forth.

56. The combination, with the work-holder carrier having the feed-gear $c^3$ and adapted to be moved in straight and semicircular courses, gear-wheel H, and pinion I, of means for imparting slow rotary motion to said pinion and faster step-by-step rotary motion to said gear-wheel independently of said pinion, substantially as set forth, and means for altering the length of the steps imparted to said gear-wheel independently of said pinion, substantially as described.

57. The combination, with the work-holder carrier C, having the feed-gear $c^3$, and adapted to be moved in straight and semicircular courses, substantially as described, of the gear-wheel H, pinion O, ratchet P, pawl Q, pawl-carrying lever Q', link L', lever L, link $D^2$, driving-lever D, slide S', pawl S, and ratchet R on said gear-wheel, substantially as set forth.

58. The combination, with the base-plate E, slide F, work-holder carrier C, carried by said slide, driving-lever D, and means for imparting from said lever straight and semicircular movements to the work-holder carrier upon said slide, substantially as described, of the link $D^2$, lever L, and means for imparting momentary to-and-fro movements to slide F from lever L, substantially as set forth.

59. The combination, with the base-plate E, slide F, and work-holder carrier C, having the feed-gear $c^3$, and carried by said slide and movable thereon in straight and semicircular courses, substantially as described, of the gear-wheel H, cam I, abutment $k$, lever J, connecting said cam, slide, and abutment, lever D, and means for imparting from the latter lever step-by-step rotary motion to said gear-wheel, substantially as set forth.

60. The combination, with base-plate E, slide F, and work-holder carrier C, having the feed-gear $c^3$, and carried by said slide and movable thereon in straight and semicircular courses, substantially as described, of the gear-wheel H, cam I, abutment $k$, lever J, connecting said slide, cam, and abutment, ratchet R, pawl S, pinion O, ratchet P, pawl Q, and means for operating said pawls, substantially as set forth.

61. The combination, with the work-holder carrier C, having the feed-gear $c^3$, and adapted to be moved in straight and semicircular courses, substantially as described, of the gear-wheel H, ratchet R, pawl S, shields $r$ $r'$, carried by and adjustable along said ratchet, and means for operating said pawl and for turning said gear-wheel independently of said pawl and ratchet, substantially as set forth.

62. The combination, with plate F, and work-holder carrier C, having the feed-gear $c^3$, and adapted to be moved in straight and semicircular courses upon said plate, substantially as described, of the gear-wheel H and ratchet R, mounted on said plate, pawl S, means for operating said pawl, and the guard T, secured to and adjustable upon said plate in respect to said pawl and ratchet, substantially as described.

63. The combination, with the work-holder carrier having the feed-gear $c^3$, and adapted to be moved to and fro lengthwise and in a semicircle, substantially as described, of the gear-wheel H, furnished with the ratchet R and pawl S, pinion O, furnished with the ratchet P, pawl Q, and hand-piece $p$, and means for operating said pawls and for throwing them into and out of place for moving said ratchets, substantially as set forth.

64. The combination, with the work-holder carrier C, having the feed-gear $c^3$, and adapted to be moved to and fro in straight and semicircular courses, substantially as described, of the gear-wheel H, ratchet R, pawl S, pinion O, ratchet P, pawl Q, means for operating said pawls, and the pawl-shifter U, by which said pawls can be thrown out of and into place for moving said ratchets, substantially as set forth.

65. The combination, with the slide F, work-holder carrier C, carried by said slide, and means for imparting to the work-holder carrier straight and semicircular movements upon said slide, substantially as described, of the cam M, mounted and connected with said slide and adapted to be turned to and fro, substantially as set forth, so that said slide shall receive to-and-fro movements by the to-and-fro turning of said cam.

66. The combination, with the slide F, part L, work-holder carrier C, carried by said slide, and means for imparting straight and semicircular movements to the work-holder on said slide and to-and-fro movements to part L, substantially as described, of the cam M, mounted and adapted to be turned to and fro, and connected with part L and with said slide, substantially as set forth, so that the slide F shall receive to-and-fro movements by the to-and-fro movements of the part L, and further to-and-fro movements by the to-and-fro turning of said cam, as specified.

67. The combination, with slide F, work-holder carrier C, carried by said slide, and means for imparting to the work-holder carrier straight and semicircular movements upon said slide, substantially as set forth, of the cam M, having the arm M', and connected with said slide, substantially as described, and the stops W and X for limiting the to-and-fro turning movements of said cam, as specified.

In testimony whereof I hereunto set my hand, in the presence of two subscribing witnesses, this 25th day of August, 1882.

JOSEPH P. HALLENBECK.

Witnesses:
DE WITT C. COWDREY,
JAS. T. FRANKLIN.